INVENTOR
Hermann Kumpf &
Hans Kröpfl

United States Patent Office 3,137,638
Patented June 16, 1964

3,137,638
NEUTRONIC REACTOR FUEL ELEMENTS
Hermann Kumpf and Hans Kröpfl, Erlangen, Germany, assignors to Siemens-Schuckertwerke Aktiengesellschaft, Erlangen, Germany, a corporation of Germany
Filed Apr. 29, 1960, Ser. No. 25,665
Claims priority, application Germany May 23, 1959
3 Claims. (Cl. 176—78)

The present invention relates to fuel elements for neutronic reactors, particularly of the heterogeneous variety.

It is well known that a neutronic reactor is employed for inducing a nuclear chain reaction within a mass of fissionable material contained within the reactor. Common examples of the fissionable isotopes are $U^{233}$, $U^{235}$, and $Pu^{239}$. Within the reactor the fissionable isotope frequently is admixed with or otherwise supported adjacent certain fertile materials, for example, uranium 238 or thorium 232, which under neutronic irradiation are transmuted into the fissionable isotopes $Pu^{239}$ and $U^{233}$ respectively. Each fissioning atom emits an average of slightly less than three neutrons, of which one is required for the propagation of the chain reaction when the reactor has achieved equilibrium conditions. The remaining neutrons are absorbed in structural, moderator, and control materials employed in the reactor and in the aforementioned fertile materials, if employed. The fissional and fertile materials are designated collectively by the term fissile materials.

The emitted neutronic product of the chain reaction are characterized by velocities in the fast region, which in most heterogeneous reactors is relatively ineffective in propagating the chain reaction. Accordingly, a moderating material, which can also serve as the coolant medium for the reactor, is employed for slowing the fast neutrons to thermal or epithermal velocities, which are most efficient for the nuclear reaction in conventional heterogeneous reactors.

In order to endow the fissile mass of the reactor with an appreciable life cycle, the reactor core is provided with an excess reactivity by adding fissionable isotope in excess of the critical mass of the fissile material. In a heterogeneous reactor the excess reactivity of the core is compensated by shim control members which at the beginning of core life are substantially fully inserted into the core and are withdrawn gradually during the core cycle to compensate for fuel burnup. Transient core conditions usually are controlled by differing or separate control members or rods movable either individually or in banks or groups relative to the core. In either case, the control members contain an efficient neutron absorbing material such as boron, hafnium, gadolinium, or the like.

The structure and theory of operation of neutronic reactors are more fully described in the Fermi et al. Patent 2,708,656, issued May 17, 1955, and in a copending application of R. J. Creagan, entitled "Neutronic Reactor," filed September 27, 1957, Serial No. 686,778, now abandoned, and assigned to the present assignee.

The fuel elements for heterogeneous neutronic reactors frequently comprise a plurality of fuel rods which are combined into a number of fuel assemblies. The latter are secured in place within the reactor core structure by mounting means engaging the ends of the fuel assembly. Frequently employed as mounting means are perforated plates secured adjacent the ends of the fuel rods and flow nozzles spacedly secured to the plates. The perforated plates and the nozzles permit the reactor coolant to pass therethrough and at the same time are so disposed that remotely controlled gripping devices (not shown) can grip and manipulate the fuel assembly. The flow nozzles, which can be of tubular or cruciform configuration, for example, are inserted respectively into apertured end plates of the core structure.

Due to the relatively great length as compared not only as to their individual diameters but as to the lateral dimension of the fuel assembly, the fuel rods if employed without reinforcing means tend to bow and to vibrate during operation. The vibration, of course, induces undue wear of the rods, but more importantly the bowing of the rods tends to restrict fluid flow, usually longitudinally of the rods, and thus to induce hot spots within the reactor core. Therefore, it has become the practice to provide a lateral spacing arrangement or joining means distributed along the length of the fuel assembly, preferably at selected locations along the length of the rods. Previous lateral joining means, however, either required welding or brazing to the individual fuel rods or required a relatively large number of component parts with the attendant introduction of flow restricting material into the flow areas between adjacent fuel rods. Welding or brazing, of course, is undesirable, not only because of the considerable labor and other expense involved, but also because a relatively thin cladding material provided for each fuel rod might be ruptured. Of course, if such rupture is not discovered until after the fuel assembly is put into use, the ruptured cladding would permit the escape of highly radioactive fission products into the reactor cooling system. On the other hand, the rupture of the cladding of only one fuel rod would necessitate the scrapping of an entire welded assembly of fuel rods. Moreover, use of welded or brazed lateral joining means prevents relative longitudinal movement among the fuel rods of each assembly inasmuch as the fuel rods of each assembly are subject to differing thermal expansions as a result of variable flow rates in different portions of the fuel assembly, proximity of some of the rods to structural materials, flux peaking in adjacent control rod channels, inevitable hot spots within the reactive core, such as caused by xenon tilt, and the like.

In those lateral joining means which are not welded or brazed to the fuel rods, difficulty has been encountered in the restriction of fluid flow through the reactor or in the fuel rods not being held securely enough by the lateal joining means.

The present invention, accordingly, has for an object the provision of novel and efficient forms of lateral joining means adapted particularly for use at selected positions along the length of an elongated fuel assembly.

Another object of the invention is the provision of lateral joining means of the character described which are adapted for securely and slidably engaging the individual fuel rods of the assembly so that differing degrees of thermal expansion among the fuel rods are afforded without resulting in bowing of the fuel assembly.

Another object of the invention is the provision of lateral joining means of the character described which can be fabricated readily and with a minimum of component parts.

Another object of the invention is the provision of such lateral joining means, which can be introduced into the fuel assembly with minimal restriction of coolant flow within the assembly.

A further object of the invention is the provision of lateral joining means of the character described, which can be joined to or frictionally engaged with the individual fuel elements of the fuel assembly without the necessity of welding or brazing the components of the joining means to the fuel elements.

Still another object of the invention is the provision of lateral joining means of the character described, wherein the individual components of the joining means can be joined frictionally to the fuel rods or to each other or both so that the entire lateral joining means can be constructed and joined to the fuel element assembly with little or no brazing or welding.

These and other features and advantages and objects of the invention will be elaborated upon more fully during the forthcoming description of illustrative embodiments of the invention, with the description being taken in conjunction with the accompanying drawings, wherein.

In accordance with the broad teachings of the invention, the lateral joining means disclosed herein include a plurality of components which are frictionally engaged with the individual elements of the fuel assembly. The components are so arranged such that both the component of the joining means and the individual elements of the fuel assembly are joined laterally with a minimum of rigid connections, such as spot welds, or in other applications with such connections being eliminated altogether. In any event welding or brazing the lateral joining means directly to the jacket or cladding of the individual fuel elements is eliminated, save for a very few rigid connections, if desired, to ensure that the lateral joining means does not move longitudinally of the fuel assembly. The number and thickness of the components employed in the lateral joining means of the invention are minimized so that the flow of coolant through the fuel assembly is not appreciably reduced. Along this line, the area of contact between the individual fuel elements and the lateral joining means is minimized so that the proper transfer of heat from the fuel elements to the reactor coolant is not impaired. Furthermore, minimization of the area of contact between the components of the lateral joining means and the fuel elements considerably reduces corrosion of the fuel element cladding at the points of contact. The lateral joining means of the present invention in addition affords at least quadruple lateral support for its equivalent for each of the individual elements of the neutronic fuel assembly.

Figure 1:
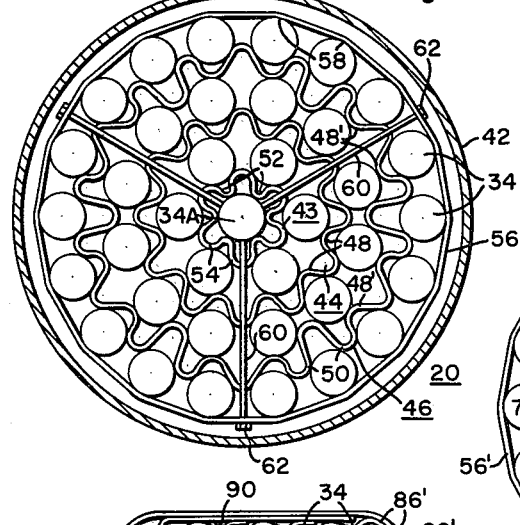
FIGURE 1 is a cross sectional view of one form of neutronic fuel assembly constructed in accordance with the invention.
Figure 5:
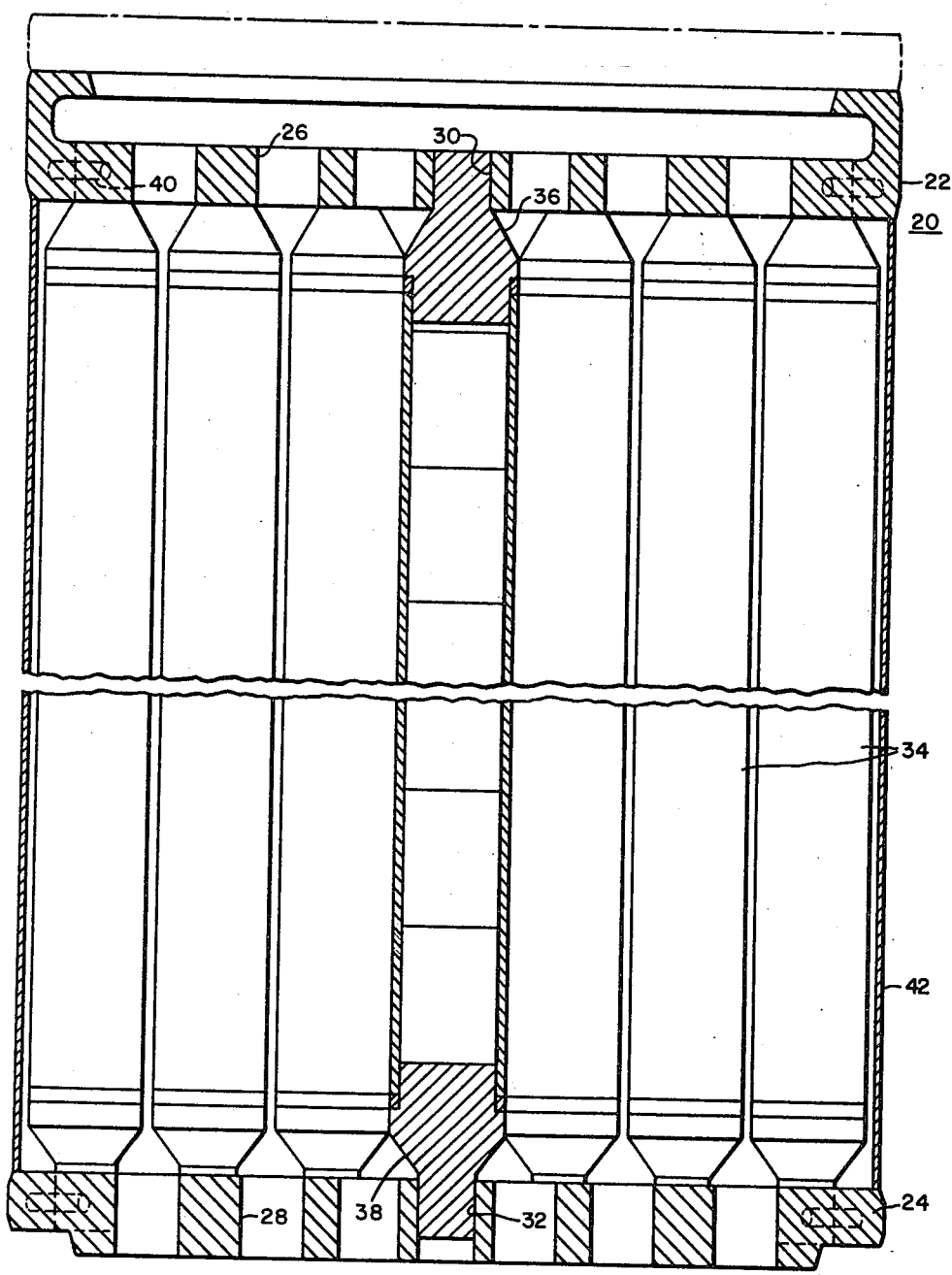
FIG. 5 is an enlarged longitudinal section view, with parts being removed for clarity, of an exemplary complete fuel assembly to which the invention is applicable.

Referring now to FIGS. 1 and 5 of the drawings, an illustrative fuel assembly is depicted having one form of lateral joining means constructed in accordance with the invention, with the details of the joining means being described hereinafter. The fuel assembly 20 as better shown in FIG. 5, includes a pair of end plates 22 and 24 each provided with flow openings 26 and 28, respectively. The end plates 22 and 24 additionally are provided with apertures 30 and 32 into which the individual fuel elements 34 are mounted. In furtherance of this purpose, each fuel element 34 is provided with end plugs 36 and 38 which in turn have stud projections adapted to fit slidably within the apertures 30 and 32, respectively. In order to secure components of the fuel assembly together, some of these stud projections are rigidly secured within their corresponding apertures by means of pins 40, in this example inserted from the circumferential edges of the end plates 22 and 24. The remainder of the fuel elements 34 are then free to move relative to the apertures 30 or 32 to permit differential thermal expansion therebetween. Alternatively, the pins 40 can be eliminated and the end plates 22 and 24 can be joined solely by a protective sheath 42.

A similar form of the fuel assembly 20 of FIG. 5 is described in greater detail and claimed in a copending application of S. N. Tower, filed April 22, 1960, Serial No. 24,128, entitled "Neutronic Reactor" and assigned to the present assignee. The aforementioned copending application in addition describes in detail and claims an exemplary reactor system with which the aforementioned fuel element assembly 20 can be employed.

Referring now specifically to FIG. 1 of the drawings, the lateral joining means of the invention as exemplified therein is particularly adaptable for use with a plurality of fuel elements 34 arranged within a sheath member 42 in a circular array, although other arrangements of the fuel elements 34 can be employed as will be shown subsequently. In this example, the lateral joining means includes a number of undulated generally concentric bands 43, 44 and 46. The outer bands 44 and 46 are disposed generally between adjacent circular rows of the fuel elements 34, respectively. The inwardly extending folds 48 of the bands 44 and 46 engage the inwardly adjacent fuel elements 34 while the outer folds 50 of these bands engage the outwardly adjacent fuel elements. It will be seen that, while each outer fold 50 engages a pair of fuel elements 34, some of the inner folds 48' engage only a single fuel element to compensate for the differing numbers of fuel elements 34 in each annular row. In furtherance of this purpose, the folds 48' of each band 44 or 46 are relatively more shallow than the folds 48. With this arrangement, it is evident that each fuel element 34 in the intermediate annular rows of fuel elements, as viewed in FIG. 1, are afforded quadruple lateral support i.e., at four points in a single cross-sectional plane.

The innermost undulated band 43 is constructed similarly with the exception that its inner and outer folds 52 and 54, respectively, are of uniform curvature or depth. Each of the outer folds 54 engages a pair of the fuel elements 34 disposed in the innermost annular row of fuel elements. Each of the inner folds 52, however, engages the central fuel element 34A of the fuel assembly 20. Desirably, the sizes of the folds 52 and 54 and also those of the folds 48, 48' and 50 are such that when the fuel elements 34 are inserted between the concentric bands 43, 44 and 46 at least a light bearing contact among the fuel rods 34 in the bands 43, 44 and 46 is maintained by the resiliency of the material from which the bands are constructed. In this example, the bands 43, 44 and 46 are fabricated from a suitable structural material employable in neutronic reactors, such as stainless steel. Other materials of course can be employed such as zirconium or one of its alloys. In assembling the fuel element arrangement 20, insertion of the fuel rods 34 between adjacent ones of the bands or through the central band 43 is facilitated by the tapered end plugs of the fuel elements, as better shown in FIG. 5.

The outermost annular row of fuel elements 34 are retained respectively between adjacent pairs of the outer folds 50 of the outermost undulated band 46 and the inner surface of a circumferential band 56. The band 56 desirably is tightened about the circumferential periphery of the fuel assembly 20 to ensure bearing contact among the fuel elements 34 in the bands 43, 44, 46 and 56 throughout the life of the fuel assembly 20. When thus tightened, the band 56 is bent slightly around the outwardly facing surfaces 58 of the outermost annular row of fuel elements 34 so that an equivalent of quadruple lateral support is afforded the latter mentioned fuel elements also.

The circumferential band 56 can be tightened by any conventional method or alternatively by means of radially extending stay-bolt 60 provided in accordance with the invention. The inner ends of the stay-bolts 60 are secured to the innermost undulated band 43 as by welding or by any other suitable fastening means. The stay-bolts 60 in addition pass through suitably disposed apertures in the bands 44, 46 and 56 and are secured to the latter band by means of nuts 62 or other suitable fastener. The bolts 60 not only serve to tighten the circumferential band 56 but in addition positively prevent longitudinal displacement of components of the lateral joining means shown in FIG. 1. Another advantage of the bolts 60 when thus employed lies in the fact that assembly of the fuel element arrangement 20 is facilitated by initially positioning the concentric bands 43, 44 and 46 relative to one another and to the circumferential band 56.

Figure 2:
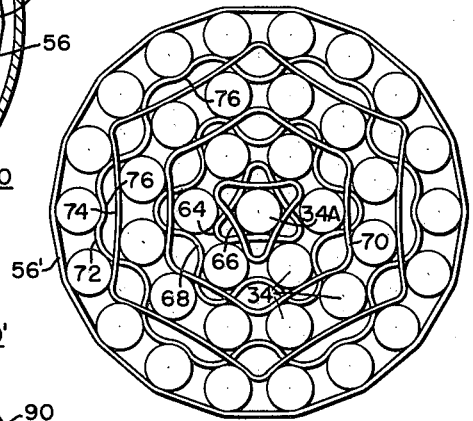
FIG. 2 is a cross sectional view of a modified form of the fuel assembly depicted in FIG. 1.

It will be seen that the lateral joining means of FIG. 1 can be assembled without the use of welding, brazing, or other fastening means, other than the stay-bolts and nuts 60 and 62. As pointed out previously, however, the latter can be eliminated in certain applications at least and the components of the joining means just described and the fuel elements 34 can be held together laterally with the sole use of frictional engagement therebetween. Referring now to FIG. 2 of the drawings, a modified form of the lateral joining means of FIG. 1 is shown. In the latter arrangement of the invention, the pair of more or less undulated bands 64, 66 or 68, 70 or 72, 74 are inserted between adjacent annular rows of the fuel elements 34.

The innermost pair of undulated bands surround the central fuel elements 34A of FIG. 2 and are rotatively displaced approximately 60° of one another. Each of the innermost bands 64 and 66 is formed with three outwardly extending folds as shown which engage differing pairs respectively of the innermost annular row of fuel elements 34. On the other hand, the three sides of each band 64 or 66 are bowed inwardly for at least light bearing contact with the central fuel element 34A. The bands 70 and 74 of the outer pairs of bands are similarly shaped in regard to the innermost band 64 and 66 with the exception that six such outwardly extending folds are employed. The intervening sides of the bands 70 and 74 likewise are bowed inwardly as shown in FIG. 2 to engage one and two fuel elements 34, respectively, of the inwardly adjacent annular rows of fuel elements 34.

Cooperating with the undulated band 70 is the other member of the pair of bands, 68, provided in this example with inward and outward folds in the manner similar to that described in connection with FIG. 1. The inner folds of the band 68 engage respectively the pairs of fuel elements 34 of the innermost annular row of such fuel elements. However, the outer folds of the band 68 engage every other pair of fuel elements in the intermediate annular row of such fuel elements. Thus, the band 68 cooperates with the band 70 and the bands 68, 70 in turn with the innermost bands 64, 66 in providing quintuple lateral support for each fuel element 34 in the innermost annular row of fuel elements.

The undulated band 72 likewise cooperates with the band 74 previously described. In the band 72, however, the inner inwardly extending folds engage only every other pair respectively of the intermediate annular row of fuel elements 34. On the other hand, the outwardly extending folds of the band 72 are double humped as shown in FIG. 2 of the drawings so that each outward fold of the band 72 engages three of the outermost annular row of fuel elements 34. The bands 72 and 74 thus cooperate with each other and with a circumferential band 56', similar to the band 56 of FIG. 1, to afford at least equivalent quadruple lateral support for each fuel element in the outermost row of fuel elements. It will be seen from FIG. 2 that every third one of the fuel elements in the outermost row has the dwell portion 76 of one of the double humped outer bends bent around it such that equivalent quadruple support is afforded here also.

The bands 64, 68 and 72 are displaced slightly longitudinally of the remaining undulated bands to provide clearance for their overlapping portions. The circumferential band 56' desirably coextends in width to the combined widths of each overlapping pair of bands 72, 74 or 68, 70 or 64, 66 and is tightened. In this example it can be tightened by any conventional means to apply at least light compression to the fuel elements 34 and associated components of the lateral joining means. If desired, the bands 64, 66 and 56' can be positioned laterally and longitudinally through the use of suitably notched radial stays in a manner described in the copending application of Hans Kröpfl entitled "Neutronic Reactor Fuel Elements," filed April 22, 1960, Serial No. 24,127, and assigned to the present assignee.

Figure 3:
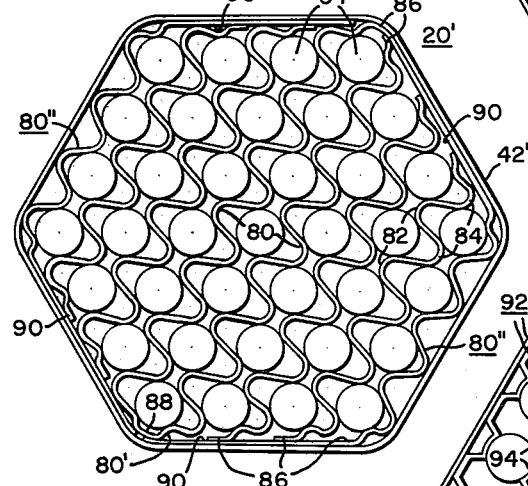
FIG. 3 is a cross sectional view of another form of the neutronic fuel assembly arranged in accordance with the teachings of this invention.

Referring now to FIG. 3 of the drawings, a similar fuel element arrangement 20' and laterally joining means therefor is illustrated therein. The fuel arrangement 20' is similar to that shown in FIG. 5 with the exception of the hexagonal configuration. The lateral joining means of FIG. 3 is particularly adapted for use with a similarly modified sheath 42'. The lateral joining means in this example includes a plurality of generally linear, undulated bands 80, with at least one of the bands 80' being doubled back on itself in order to provide preliminary strength and spacing during assembly of the fuel arrangement 20'. It will be seen that the undulated bands 80 are arranged respectively generally between linear rows of the fuel elements 34, which in FIG. 3, are arranged in a triangular lattice. The alternate folds 82 of a given band engage pairs of fuel elements 34 in one adjacent row of the fuel elements while the remaining folds 84 similarly engage the fuel elements of the other adjacent row. The peripheral fuel elements are spaced in similar manner from the inner surface of the sheath 42' by oppositely disposed bands 80" engaging some of the latter mentioned fuel elements in the inner surface of the sheath 42' and by suitably disposed mounting tabs 86 formed at the ends of the undulated bands 80. Those peripheral fuel elements engaged by the doubled band 80' are supported by a loop 88 and by the mounting tabs 86' formed at the respective ends of the band 80'. The outer undulated bands 80" are provided with elongated mounting tabs 90 to which the mounting tabs 86 of the remaining bands 80 or 80" can be preliminarily secured before inserting the fuel rods 34 through the lateral joining means. In furtherance of this purpose, one of the mounting tabs 86' of the doubled undulated band 80' desirably is made integral with one of the mounting tabs 90 of one of the outer bands 80", as shown in FIG. 3 of the drawings. The tabs 86 or 86' can be secured to the tabs 90 for example by spot welding.

With the aforedescribed arrangement, each of the fuel rods 34 is afforded quadruple lateral support. The dimensions of the undulated band 80, 80' and 80" can be arranged so that when the fuel rods 34 are inserted therebetween, the latter will be engaged with frictional forces induced by the resiliency of the material from which the bands are formed. As pointed out previously, stainless steel can be utilized for this purpose. With the arrangement of FIG. 3, the peripheral fuel rods also are spaced from the sheath 42'. Alternatively, the latter can be eliminated and a circumferential band (not shown) similar to the band 56 or 56' of FIGS. 1 and 2, can be substituted. In the latter arrangement, the aforementioned band can be tightened by conventional means about the lateral joining means of FIG. 3 so that the preliminary welding mentioned previously can be eliminated.

Figure 4:
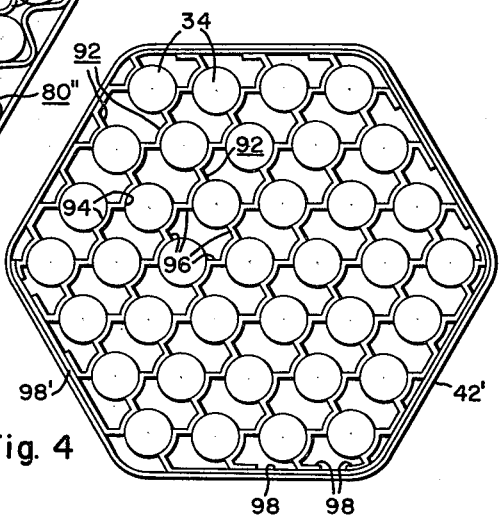
FIG. 4 is a cross sectional view showing a modified form of the fuel assembly illustrated in FIG. 3.

Referring now to FIG. 4 of the drawings, a modified form of the lateral joining means of FIG. 3 is depicted. In the arrangement of FIG. 4, a plurality of bands 92 which are shaped in accordance with the invention are arranged alternately with rows of the fuel elements 34. The configuration of the bands 92 might be termed undulated, with the exception that the extremities of the folds or bends of the bands are depressed or given a concave shape 94 which is complementary with the cylindrical outer surface of the fuel elements 34. With this arrangement, then, each of the fuel elements 34 is engaged by only two bends or folds of the lateral joining means rather than four as in the case of FIG. 3.

However, inasmuch as the concave portions 94 are bent around the fuel elements, so to speak, each of the latter is provided with equivalent quadruple support. The quadruple supports afforded the fuel elements 34 of FIG. 4 is quite efficient inasmuch as lines extending through the leg portions 96 of the folds of each of the bands 92 pass substantially through the central axes of the fuel elements 34.

Each of the bands 92 is provided at its ends with mounting tabs 98 with some of the tabs 98' extending about the periphery of the joining means to provide the preliminary engagement if desired described in connection with FIG. 3. The joining means of FIG. 4 can be employed with the sheath member 42' or with a circumferential band member, both of which have been described above in connection with FIG. 3.

From the foregoing, it will be apparent that novel and efficient forms of lateral joining means suitable for use with nuclear fuel assemblies have been disclosed herein. Depending upon the length of the fuel assembly (FIG. 5) one or more of each form of the lateral joining means described herein can be employed in positions intermediate the ends plates 22 and 24 and spaced along the length of the elongated fuel elements 34, as desired. Each lateral joining means described herein is particularly adapted to afford quadruple lateral support or its equivalent to each of the fuel elements 34 in order to ensure that bowing of individual fuel elements in the assembly 20 or 20' does not occur. For the reasons stated then, a relatively rigid and efficient lateral joining means is disclosed herein particularly in that form of the invention illustrated in FIG. 4 of the drawings.

It will be appreciated that numerous modifications of the invention can be made by those skilled in the art without departing from the spirit and scope of the invention. Moreover, it is to be understood that certain features of the invention can be employed without a corresponding use of other features thereof.

Accordingly, what is claimed as new is:

1. A fuel assembly for a neutronic reactor, said assembly comprising a plurality of elongated fuel elements, means engaging the ends respectively of said fuel elements for supporting said fuel elements so that at least some of said ends are capable of limited relative movement, said fuel elements being arranged in a circular array, a plurality of substantially concentric continuous undulated resilient bands inserted respectively between adjacent rows of said fuel elements, the respective folds of each band being mutually arranged in a circle and engaging adjacent fuel elements at points lying in a common plane transverse to said fuel elements so that each of said fuel elements is afforded elastic lateral support at said points, a circumferential band surrounding said fuel assembly adjacent said undulated band, a plurality of stay means extending radially and inserted through said undulated bands, said stay means being secured to the innermost one of said undulated bands and to said circumferential band for applying compressive forces to said fuel elements and said undulated bands.

2. A fuel assembly for a neutronic reactor, said assembly comprising a plurality of elongated fuel elements, means engaging the ends respectively of said fuel elements for supporting said fuel elements so that at least some of said ends are capable of limited relative movement, said fuel elements being arranged in a circular array, a plurality of substantially concentric continuous undulated resilient bands inserted respectively between adjacent rows of said fuel elements, the respective folds of each band being mutually arranged in a circle and engaging adjacent fuel elements at points lying in a common plane transverse to said fuel elements so that each of said fuel elements is afforded elastic lateral support at said points, a circumferential band surrounding said fuel assembly adjacent said undulated bands, a plurality of radially disposed stay-bolts, each of said stay-bolts passing through said undulated bands and being secured to the innermost one of said bands, each of said stay-bolts in addition passing outwardly through said circumferential band, and tightening means coupled to the outer end of said stay-bolts and engaging said circumferential band to tighten the latter about said fuel assembly.

3. A fuel assembly for a neutronic reactor, said assembly comprising a plurality of elongated fuel elements, means engaging the ends respectively of said fuel elements for supporting said fuel elements so that said ends are capable of limited relative movement, a plurality of concentric undulated resilient bands inserted respectively between adjacent rows of said fuel elements, a circumferential band surrounding said plurality of fuel elements adjacent said undulated bands, said bands and said fuel elements being so disposed that each fuel element is engaged at opposite sides thereof by said bands at points lying in a common plane to provide elastic lateral support therefor at said points, and a plurality of radially disposed stay-bolts passing through said bands, said stay-bolts being provided with tightening means for applying compressive forces to said fuel elements and said undulated bands.

References Cited in the file of this patent

UNITED STATES PATENTS

| | | |
|---|---|---|
| 1,748,140 | Muhleisen | Feb. 25, 1930 |
| 1,790,817 | Jacobus | Feb. 3, 1931 |
| 2,161,019 | Coy | June 6, 1939 |
| 2,174,318 | Ellis | Sept. 26, 1939 |
| 2,999,059 | Treshow | Sept. 5, 1961 |
| 3,068,163 | Currier et al. | Dec. 11, 1962 |

FOREIGN PATENTS

| | | |
|---|---|---|
| 685,848 | Great Britain | Jan. 14, 1953 |
| 152,463 | Australia | July 21, 1953 |

OTHER REFERENCES

GER–1301, "A Design Description of the Dresden Nuclear Power Station," November 1956, pp. 12 and 13.